G. HOPSON.
Carriage-Springs.
No. 143,576. Patented Oct. 14, 1873.
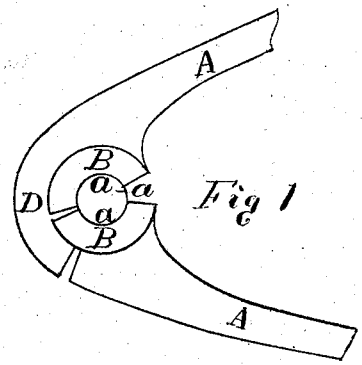
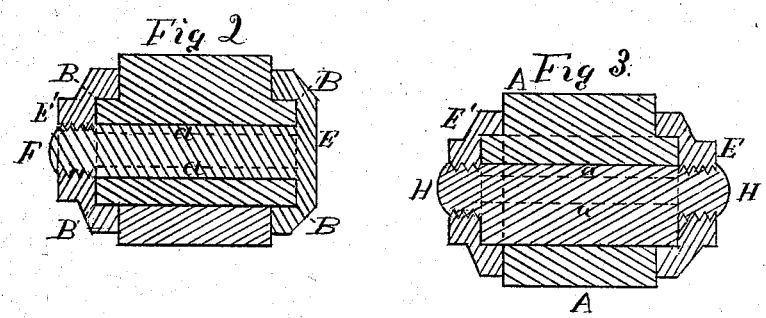
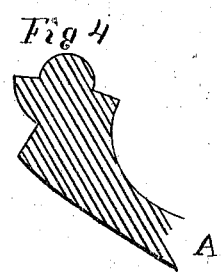

UNITED STATES PATENT OFFICE.

GEORGE HOPSON, OF BRIDGEPORT, CONNECTICUT.

IMPROVEMENT IN CARRIAGE-SPRINGS.

Specification forming part of Letters Patent No. 143,576, dated October 14, 1873; application filed February 5, 1872.

*To all whom it may concern:*

Be it known that I, GEORGE HOPSON, of Bridgeport, county of Fairfield, State of Connecticut, have invented certain Improvements in Carriage-Springs, of which the following is a specification:

My invention consists in the addition of bearings to the sides of the spring-plates, and in so constructing the joint that it will bear the whole width of the plate, the uniting of the upper and lower plates by a bolt, or equivalent, with a cup-shaped head and nut, and in the addition of an overhang to cover the joint, the object being to increase the length of the bearing-surface of the head, protection against dirt, &c., to lessen the friction, give increased symmetry of form, and to facilitate the manufacture of the same.

In the drawings, Figure 1 is a side view of the head with the nut removed. Fig. 2 is a cross-section of the head. Fig. 3 is a cross-section, showing the stud-bolts.

A A are portions of the spring-plate, to which the bearing is attached. B B are bearings forged to the spring-plate, and projecting each side. C C are grooves or channels forming a bearing the whole width of joint; D, overhang. F is a bolt fitting into the grooves C C; E E, the head and nut of the bolt, made cup-shaped to fit the outside bearings B B; G, an allowance for play of the spring.

To the end of the spring-plate A solid bearings are forged crosswise, and projecting beyond the sides of the plates A, to form bearings B B. Across the face of this bearing, and at right angles with the plates A A, the grooves C C are made. The bearings B B are also finished on the outside up to the spring-plate, and the ends are squared to a right angle with grooves C C. The overhang D is turned over the lower plate, and covers the joint. Into the grooves C C the bolt F is fitted, on which the joint or head works. To this bolt I attach the cup-shaped head and nut E E, nicely fitted to bearings B B, which hold the head or joint together, and also provide additional bearings for the head.

Another form of construction is to mill a groove in the upper plate or bearing, and a corresponding bead on the lower plate, after forging the stud-bolts H H rigid onto the lower plate, and then fitting nuts E E to same, thereby accomplishing the same result as obtained by the bolt F. By cutting away the stock on both the upper and lower plates, on the opposite sides of bolt E from overhang D, it leaves the opening G to allow for the motion of the spring.

The advantages gained by this form of head are: First, a bearing the whole width of the head on the bolt; whereas the plan now in vogue, of turning ears at right angles to the plate, and of about the same thickness, gives only a short bearing on bolt, that soon cuts away the metal and loosens the joint. The eye and ears are also fitted together just as they come from the swage, making a rough and imperfect joint, and one that rapidly wears away. Second, the addition of the side bearings B B, working in the cup-shaped head and nut E E, gives additional bearing-surface, and overcomes the liability of a rocking motion on the joint. Third, it greatly facilitates the nicely fitting of the joint, as the parts can be readily milled to a fit. Fourth, it gives a more symmetrical form to the spring.

What I claim, and desire to secure by Letters Patent, is—

1. The spring-plates A A, having bearings C C, in combination with bolt F, when all are constructed as described.

2. The cup-bearings, formed by the projections B B forged to spring-plates A A, in combination with bolt F having head E, as described, and the cup-shaped nut E', substantially as set forth.

In testimony whereof I have signed my name to this specification before two subscribing witnesses.

GEORGE HOPSON.

Witnesses:
   D. A. TARBELL,
   A. SKAATS.